(12) United States Patent
Tokumura et al.

(10) Patent No.: US 8,803,763 B2
(45) Date of Patent: Aug. 12, 2014

(54) ELECTRO-OPTICAL DEVICE AND ELECTRONIC APPARATUS

(75) Inventors: Toshiaki Tokumura, Suwa (JP); Akihiko Ito, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 13/614,275

(22) Filed: Sep. 13, 2012

(65) Prior Publication Data

US 2013/0076707 A1 Mar. 28, 2013

(30) Foreign Application Priority Data

Sep. 27, 2011 (JP) ................................ 2011-210291

(51) Int. Cl.
*G09G 5/00* (2006.01)
*H04N 13/04* (2006.01)

(52) U.S. Cl.
USPC .......................... 345/6; 348/51; 348/E13.038

(58) Field of Classification Search
CPC .................. G09G 2310/06; G09G 2320/0276; H04N 13/0438; H04N 13/0447; H04N 13/045
USPC .................... 345/6, 204, 690; 348/51, E13.38
See application file for complete search history.

(56) References Cited

U.S. PATENT DOCUMENTS

| 2003/0098837 | A1  | 5/2003  | Iwamoto et al. |
| 2008/0259063 | A1* | 10/2008 | Kim et al. ........................ 348/51 |
| 2011/0285832 | A1* | 11/2011 | Yoon et al. ............ 348/E13.059 |

FOREIGN PATENT DOCUMENTS

| JP | 9-160065 A    | 6/1997  |
| JP | 2003-162265 A | 6/2003  |
| JP | 2005-84430 A  | 3/2005  |
| JP | 2006-267937 A | 10/2006 |
| JP | 2007-271819 A | 10/2007 |
| JP | 2009-25436 A  | 2/2009  |

* cited by examiner

*Primary Examiner* — Kevin M Nguyen
(74) *Attorney, Agent, or Firm* — ALG Intellectual Property, LLC

(57) ABSTRACT

An electro-optical device displays a right-eye image and a left-eye image for each display period. In each of the display periods, a driving circuit executes first synchronization selection driving where a first group where scanning lines are segmented into units of two is sequentially selected and a gradation potential is supplied to each of the signal lines according to a gradation in the odd rows, and executes second synchronization selection driving where a second group which is different to the first group is sequentially selected and a gradation potential is supplied to each of the signal lines according to a gradation in the even rows. A display control circuit which controls the driving circuit so that the gradation potential is supplied to each of the signal lines according to a specific gradation which corresponds to the first scanning lines of a display region.

5 Claims, 12 Drawing Sheets

FIG. 9

| | IMAGE DATA DB | | UNIT PERIOD U3 | | |
|---|---|---|---|---|---|
| | d[1]: Co | | ✕ | 1st ROW | FIRST GROUP |
| A2 | d[2]: Co | SELECTION | d[2]: Co | 2nd ROW | SECOND GROUP |
| | d[3]: Co | | d[2]: Co | 3rd ROW | FIRST GROUP |
| | d[4]: Gi | SELECTION | d[4]: Gi | 4th ROW | FIRST GROUP |
| | d[5]: Gi | | d[4]: Gi | 5th ROW | SECOND GROUP |
| | d[6]: Gi | SELECTION | d[6]: Gi | 6th ROW | FIRST GROUP |
| | d[7]: Gi | | d[6]: Gi | 7th ROW | SECOND GROUP |
| | d[8]: Gi | | d[8]: Gi | 8th ROW | FIRST GROUP |
| A1 | ⋮ | | ⋮ | | |
| | d[1081]: Gi | | d[1080]: Gi | 1081st ROW | FIRST GROUP |
| | d[1082]: Gi | SELECTION | d[1082]: Gi | 1082nd ROW | SECOND GROUP |
| | d[1083]: Gi | | d[1082]: Gi | 1083rd ROW | FIRST GROUP |
| | d[1084]: Gi | SELECTION | d[1084]: Gi | 1084th ROW | FIRST GROUP |
| | d[1085]: Gi | | d[1084]: Gi | 1085th ROW | SECOND GROUP |
| A2 | d[1086]: Co | SELECTION | d[1086]: Co | 1086th ROW | FIRST GROUP |
| | d[1087]: Co | | d[1086]: Co | 1087th ROW | SECOND GROUP |
| | d[1088]: Co | | ✕ | 1088th ROW | FIRST GROUP |

FIG. 10

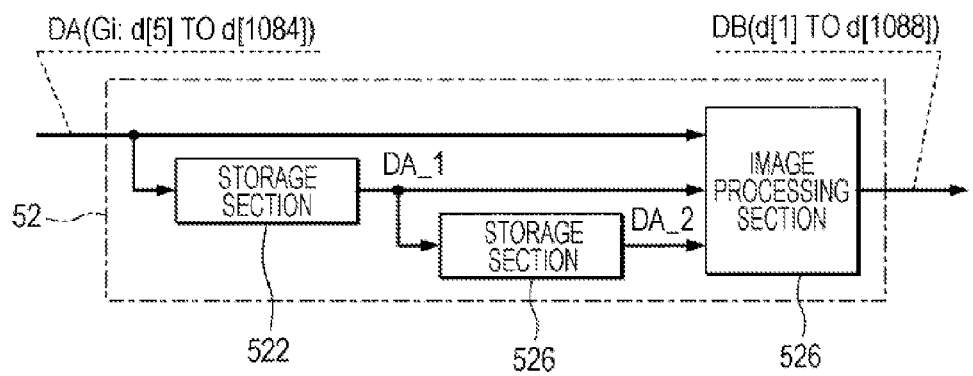

ELECTRO-OPTICAL DEVICE AND ELECTRONIC APPARATUS

BACKGROUND

1. Technical Field

The present invention relates to a technique where a right-eye image and a left-eye image are displayed so that parallax is imparted alternately such that an observer perceives a stereoscopic effect.

2. Related Art

A stereoscopic method of a frame sequential scheme where a right-eye image and a left-eye image are alternately displayed in a time divisional manner has been proposed from the past. For example, the technique disclosed in JP-A-2009-25436 uses a plurality of pixels which include liquid crystal elements, and as shown in FIG. 18, the right-eye image and left-eye image are alternately displayed in each display period P. Each of the display periods P is segmented into a unit period U1 and a unit period U2.

A display image is updated to the right-eye image from the left-eye image in the unit period U1 in the display period P of the right-eye image and the right-eye image is displayed in the immediately following unit period U2, and a display image is updated to the left-eye image from the right-eye image in the unit period U1 in the display period P of the left-eye image and the left-eye image is displayed in the immediately following unit period U2. In the unit period U1 and the unit period U2 of each of the display periods P, an applied voltage is set to reverse polarity with regard to the liquid crystal element. In the unit period U1 of each of the display periods P, both a right-eye shutter and a left-eye shutter are controlled to be in a closed state. Accordingly, mixture of the right-eye image and the left-eye image (referred to below as "crosstalk") is not perceived by the observer.

However, on the basis of the technique in JP-A-2009-25436, since each of the pixels is sequentially selected on each line and is driven at a specified gradient in each of the unit period U1 and the unit period U2, the length of time of the unit period U1, where both the right-eye shutter and the left-eye shutter are maintained in the closed state, is long. Accordingly, there is a problem in that it is difficult to sufficiently secure the brightness of a display image.

SUMMARY

An advantage of some aspects of the invention is that the brightness of the display image is improved while mixture of the right-eye image and the left-eye image being perceived by the user is suppressed.

According to an aspect of the invention, there is provided an electro-optical device which displays a right-eye image and a left-eye image for each of the display periods and which is provided with a plurality of pixels which are arranged to correspond to each intersection of a plurality of scanning lines and a plurality of signal lines; a driving circuit which, in each of the display periods, executes first synchronization selection driving where a first group is sequentially selected out of the plurality of scanning lines are divided into units of Q lines (Q is a natural number of two or more) which are adjacent to each other and a gradation potential is supplied to each of the signal lines according to a specific gradation of each of the pixels which corresponds to any scanning line in the first group in a selected state, and executes second synchronization selection driving where a second group is sequentially selected out of the plurality of scanning lines in units of Q lines which are adjacent to each other are divided into a combination which is different to the first group and a gradation potential is supplied to each of the signal lines according to a specific gradation of each of the pixels which corresponds to any scanning line in the second group in a selected state; and a display control circuit which controls the driving circuit so that the gradation potential is supplied to each of the signal lines according to a specific gradation of each of the pixels which corresponds to a first scanning line out of the second group during the selection of the second group which includes the first scanning line which corresponds to an inner side of the display region and a second scanning line which corresponds to an outer side of the display region. In the configuration above, since the gradation potential is supplied to each of the pixels in a selected state by the scanning lines being selected sequentially in units of Q lines in each of the display periods, the length of time where the right-eye image and the left-eye image are in a mixed state is shortened compared to, for example, a configuration where a gradation potential is supplied to each of the pixels by the scanning lines being selected in units of one in each of the display periods. Accordingly, it is possible for the brightness of a display image which an observer visually recognizes to be improved. Furthermore, the gradation potential is supplied to each of the signal lines according to a specific gradation of each of the pixels which corresponds to the first scanning line out of the second group during the selection of the second group which includes the first scanning line which corresponds to the inner side of the display region and the second scanning line which corresponds to the outer side of the display region. That is, since the gradation potential is supplied to each of the pixels according to a specific gradation of each of the pixels which corresponds to the first scanning line in the display region in a case where the first scanning line and the second scanning line are selected at the same time, there is an advantage in that the displaying of the specific gradation in each of the pixels on the outer side of the display region (for example, black gradation which is not related to the display image) in the display region is avoided irrespective of the configuration where the Q lines of scanning lines are selected.

It is preferable that in a configuration where the plurality of scanning lines includes K lines (K is an even number) of the first scanning lines, in each of the display periods, the driving circuit executes the first synchronization selection driving where the first group is sequentially selected so that the plurality of scanning lines are segmented into units of two which are adjacent to each other between the first scanning line and the second scanning line as the boundary and a gradation potential is supplied to each of the signal lines according to a gradation which is specified from an image signal for each of the pixels which corresponds to odd rows of the scanning lines out of the first group in a selected state and the second synchronization selection driving where the second group is sequentially selected so that the plurality of scanning lines are segmented into units of two which are adjacent to each other by combining with a one line deviation with regard to the first group and a gradation potential is supplied to each of the signal lines according to a gradation which is specified from an image signal for each of the pixels which corresponds to even rows of the scanning lines out of the second group in a selected state, there is a possibility that a problem occurs in the controlling of the specific gradation on the outer side of the display region with regard to each of the pixels which correspond to the first scanning line which is selected first out of the K lines of the first scanning lines. Accordingly, the display control circuit generates an image signal so that a specific gradation of each of the pixels corresponding to the first scanning line is specified as the specific gradation of each of the pixels which corresponds to the second scanning line which is adjacent to the first scanning line selected first out of the K lines of the first scanning lines. According to the configuration above, it is possible to effectively solve the problem that the specific gradation at the outer side of the display region is displayed in a region which corresponds to the first scanning line which is selected first out of the K lines of the first scanning lines. Here, specific examples of the above aspects will be described later as, for example, a first embodiment.

It is preferable that in a configuration where the plurality of scanning lines includes K lines (K is an even number) of first scanning lines and where, in each of the display periods, the driving circuit executes the first synchronization selection driving where the first group is sequentially selected so that the plurality of scanning lines are segmented into units of two which are adjacent to each other with between the first scanning line and the second scanning line as the boundary and a gradation potential is supplied to each of the signal lines according to a gradation where an image signal is specified for each of the pixels which corresponds to even rows of the scanning lines out of the first group in a selected state and the second synchronization selection driving where the second group is sequentially selected so that the plurality of scanning lines are segmented into units of two which are adjacent to each other by combining with a one line deviation with regard to the first group and a gradation potential is supplied to each of the signal lines according to a gradation where an image signal is specified for each of the pixels which corresponds to odd rows of the scanning lines out of the second group in a selected state, there is a possibility that a problem occurs in the controlling of the specific gradation on the outer side of the display region with regard to each of the pixels which correspond to the first scanning line which is selected last out of the K lines of the first scanning lines. Accordingly, the display control circuit generates an image signal so that a specific gradation of each of the pixels corresponding to the first scanning line is specified as the specific gradation of each of the pixels which corresponds to the second scanning line which is adjacent to the first scanning line selected last out of the K lines of the first scanning lines. According to the configuration above, it is possible to effectively solve the problem that the specific gradation at the outer side of the display region is displayed in a region which corresponds to the first scanning line which is selected last out of the K lines of the first scanning lines. Here, specific examples of the above aspects will be described later as, for example, a second embodiment.

It is preferable that the driving circuit makes possible first interval selection driving where each of the scanning lines of either one of the odd rows or the even rows out of the plurality of scanning lines are sequentially selected and a gradation potential is supplied to each of the signal lines according to a specific gradation of each of the pixels which corresponds to the scanning lines in a selected state, and second interval selection driving where each of the scanning lines of the other one of the odd rows or the even rows out of the plurality of scanning lines are sequentially selected and a gradation potential is supplied to each of the signal lines according to a specific gradation of each of the pixels which corresponds to the scanning lines in a selected state, and the driving circuit executes the first interval driving after the execution of either one of the first synchronization selection driving and the second synchronization selection driving and executes the second interval driving after the execution of the other one of the first synchronization selection driving and the second synchronization selection driving. According to the configuration above, the resolution of the display image due to the first synchronization selection driving and the second synchronization selection driving is changed to an expected resolution according to the first interval selection driving or the second interval selection driving. Accordingly, there is an advantage in that it is possible to display a high-precision right-eye image or left-eye image in each of the display periods.

The electro-optical device according to each of the above aspects is adopted in various electronic apparatuses as a display body. For example, a stereoscopic display device, which is provided with the electro-optical device according to each of the above aspects and stereoscopic glasses which are controlled by a glasses control circuit, is exemplified as the electronic apparatus of the invention.

BRIEF DESCRIPTION OF THE DRAWINGS

The invention will be described with reference to the accompanying drawings, wherein like numbers reference like elements.

FIG. 9 is an explanatory diagram of image data in the first embodiment.

FIG. 10 is a block diagram of a first processing section.

DESCRIPTION OF EXEMPLARY EMBODIMENTS

First Embodiment

Figure 1:
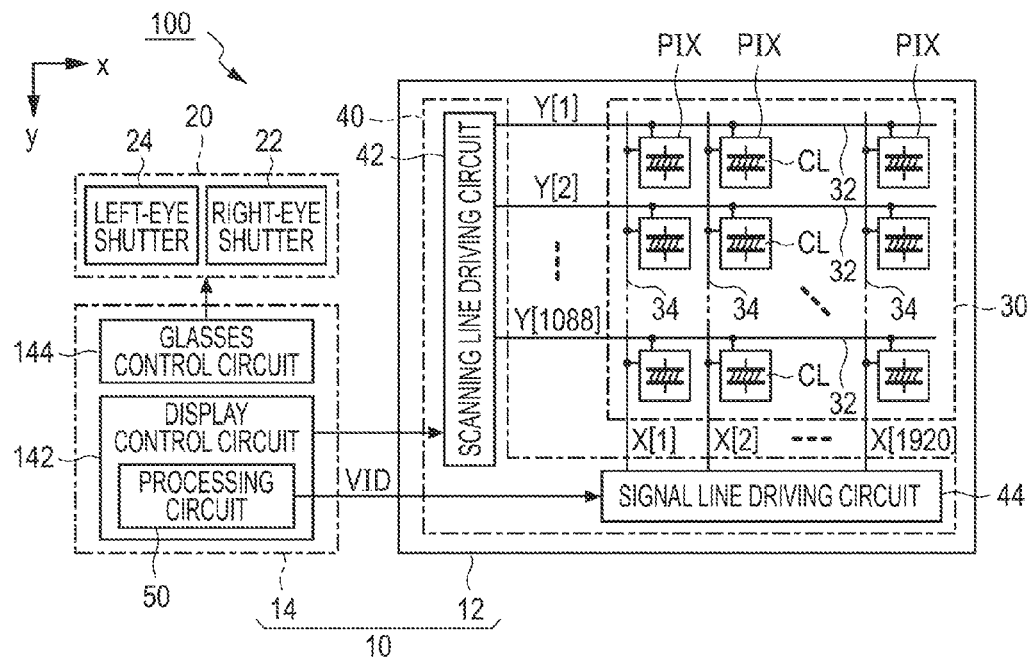
FIG. 1 is a block diagram of a stereoscopic display device according to a first embodiment of the invention.

FIG. 1 is a block diagram of a stereoscopic display device 100 according to one embodiment of the invention. The stereoscopic display device 100 is an electronic apparatus which displays stereoscopic images using an active shutter method where a viewer is able to perceive a stereoscopic effect and is provided with an electro-optical device 10 and stereoscopic glasses 20. The electro-optical device 10 alternatively displays a right-eye image GR and a left-eye image GL where parallax is imparted mutually in a time divisional manner. Here, a case is described below where the right-eye image GR and the left-eye image GL are comprehensively represented as an image Gi (i=R, L).

The stereoscopic glasses 20 are a glasses type of device which an observer wears to visually recognize a stereoscopic image which is displayed by the electro-optical device 10, and are provided with a right-eye shutter 22 which is positioned in a forward direction of the right-eye of the observer and a left-eye shutter 24 which is positioned in a forward direction of the left-eye of the observer. The right-eye shutter 22 and the left-eye shutter 24 are respectively controlled in an open state where irradiated light is transmitted therethrough (transmitting state) and a closed state where irradiated light is blocked (light blocking state). For example, due to changes in orientation direction of a liquid crystal according to an applied voltage, a liquid crystal shutter which changes from either one of the open state and the closed state to the other one may be adopted as the right-eye shutter 22 and the left-eye shutter 24.

The electro-optical device 10 in FIG. 1 is provided with an electro-optical panel 12 and a control circuit 14. The electro-optical panel 12 includes a pixel section 30 where a plurality of pixels (a pixel circuit) PIX are arranged and a driving circuit 40 which drives each of the pixels PIX. In the pixel section 30, 1088 lines of scanning lines 32 which extend in an x direction and 1920 lines of signal lines 34 which extend in a y direction which intersects the x direction are formed. The plurality of pixels PIX in the pixel section 30 are arranged in a matrix formation to correspond to each intersection of the scanning lines 32 and the signal lines 34. Here, the number of the scanning lines 32 and the signal lines 34 may be arbitrarily changed.

Figure 2:
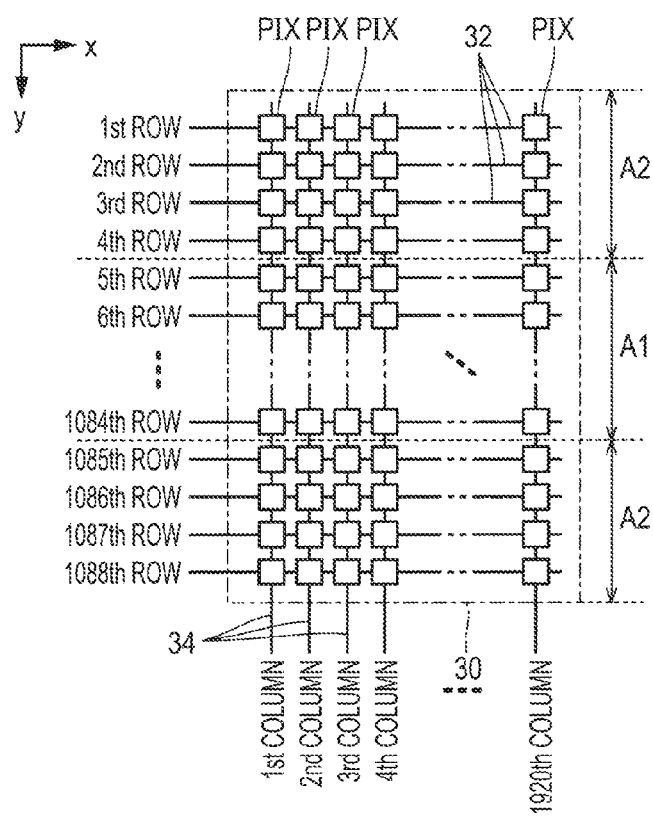
FIG. 2 is a schematic view of a pixel section.

As shown in FIG. 2, the pixel section 30 is segmented into a display region A1 and a peripheral region A2. The display region A1 is a region which is actually used in image display (effective display region) and the peripheral region A2 which marks out the periphery of the display region A1 is a region which does not contribute to the image display (that is, is a dummy region which the observer is not able to visually recognize the display image). For example, a light blocking layer is formed in the peripheral region A2.

1080 lines of the scanning lines 32 from the $5^{th}$ row to the $1084^{th}$ row out of the 1088 scanning lines 32 in the pixel section 30 corresponds to the display region A1 and four lines of the scanning lines 32 from the $1^{st}$ row to the $4^{th}$ row and four lines of the scanning lines 32 from the $1085^{th}$ row to the $1088^{th}$ row corresponds to the peripheral region A2. Each of the pixels PIX in the 1080 rows vertically by 1920 columns horizontally which corresponds to the scanning lines 32 in the display region A1 out of the pixel section 30 are arranged in the display region A1 and are equivalent to the effective pixels which effectively contribute to the image display and each of the pixels PIX which correspond to the scanning lines 32 in the peripheral region A2 out of the pixel section 30 (the $1^{st}$ row to the $4^{th}$ row and the $1085^{th}$ row to the $1088^{th}$ row) are equivalent to the dummy pixel which does not actually contribute to the display image. When focusing on one arbitrary column in the pixel section 30, the dummy pixels PIX are arranged in units of four on both sides of the arrangement of the 1080 effective pixels PIX in the display region A1. Here, the description of the dummy pixels PIX which are on a positive side and a negative side in the x direction with regard to the display region A1 are omitted as is convenient.

Figure 3:
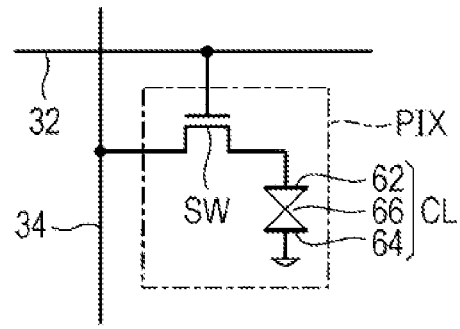
FIG. 3 is a circuit diagram of a pixel circuit.

FIG. 3 is a circuit diagram of each of the pixels PIX (the effective pixels and the dummy pixels). As shown in FIG. 3, each of the pixels PIX include a liquid crystal element CL and a selection switch SW. The liquid crystal element CL is an electro-optical element which is configured by a pixel electrode 62 and a common electrode 64 which oppose each other and liquid crystals 66 between both of the electrodes. The transmissivity (display gradation) of the liquid crystals 66 varies according to a voltage applied between the pixel electrodes 62 and the common electrodes 64. The selection switch SW is configured of an N channel type thin film transistor where a gate is connected to the scanning lines 32 and controls the electrical connection (conduction/insulation) between the liquid crystal element CL and the signal lines 34 by being interposed by the two. Here, a configuration may be adopted with the liquid crystal element CL where an auxiliary capacity is connected in parallel.

The control circuit 14 in FIG. 1 is provided with a display control circuit 142 which controls the electro-optical panel 12 and a glasses control circuit 144 which controls the stereoscopic glasses 20. Here, in addition to a configuration of the display control circuit 142 and the glasses control circuit 144 being mounted on a single integrated circuit, a configuration may be adopted where the display control circuit 142 and the glasses control circuit 144 are separately distributed onto separate integrated circuits. The display control circuit 142 controls the driving circuit 40 such that the right-eye image GR and the left-eye image GL are alternately displayed in a time divisional manner in the pixel section 30. For example, the display control circuit 142 in the first embodiment is configured to include a processing circuit 50 where an image signal VID which specifies the gradation of each of the pixels PIX in the image section 30.

Figure 4:
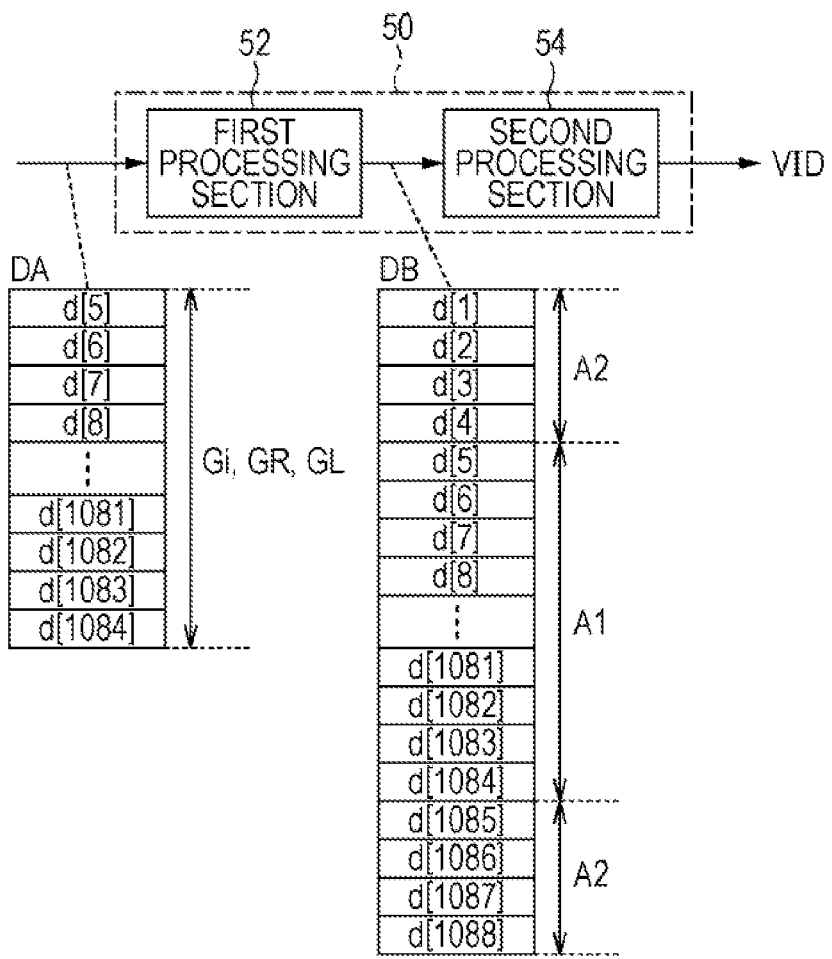
FIG. 4 is a block diagram of a processing circuit.

FIG. 4 is a block diagram of the processing circuit 50. As shown in FIG. 4, the processing circuit 50 is provided with a first processing section 52 and a second processing section 54. Image data DA which indicates the image Gi (the right-eye image GR and the left-eye image GL) is sequentially supplied to the first processing section 52 from a higher-level device (for example, an external device such as a CPU or another image processing circuit in the display control circuit). The first processing section 52 generates image data DB from the image data DA.

The image data DB which is generated by the first processing section 52 specifies a gradation d with regard to each of the pluralities of pixels PIX in the pixel section 30 (1088 rows vertically by 1920 columns horizontally). In FIG. 4, the gradation d (d[1] to d[1088]), which is specified by the image data DB with regard to each of the pixels PIX (1088) for one arbitrary row in the pixel section 30, are exemplified. The gradations d[5] to d[1084] out of the image data DB is a gradation which is specified in each of the pixels (effective pixels) PIX in the display region A1 and the gradations d[1] to d[4] and the gradations d[1085] to d[1088] out of the image data DB is a gradation which is specified in each of the pixels (dummy pixels) PIX in the peripheral region A2. The second processing section 54 in FIG. 4 generates and supplies the image signal VID which are analog from the image data DB to the driving circuit 40.

The driving circuit 40 in FIG. 1 is a circuit where a voltage is applied to the liquid crystal element CL of each of the pixels PIX according to the gradation d where the image signal VID, which is supplied from the display control circuit 142 (the processing circuit 50), is specified in each of the pixels PIX and is provided with a scanning line driving circuit 42 and a signal line driving circuit 44. The scanning line driving circuit 42 sequentially selects each of the scanning lines 32 by the supplying of scanning signals Y[1] to Y[1088] which correspond to each of the scanning lines 32. By setting a scanning signal Y[m] (m=1 to 1088) to a predetermined selection potential (that is, the scanning line 32 of the $m^{th}$ row is selected), the selection switches SW in each of the pixels PIX of the $m^{th}$ row are transitioned to an on state at the same time. The signal line driving circuit 44 respectively supplies the gradation potentials X[1] to X[1920] according to the image signal VID to the 1920 lines of signal lines 34 by synchronizing the selection of the scanning lines 32 by the scanning line driving circuit 42. Each of the pixels PIX (the liquid crystal element CL) displays gradation according to the gradation potential X[n] (n is 1 to 1920) of the signal lines 34 during the selection of the scanning lines 32 (when the selection switch SW is controlled so as to be in the on state).

Figure 5:
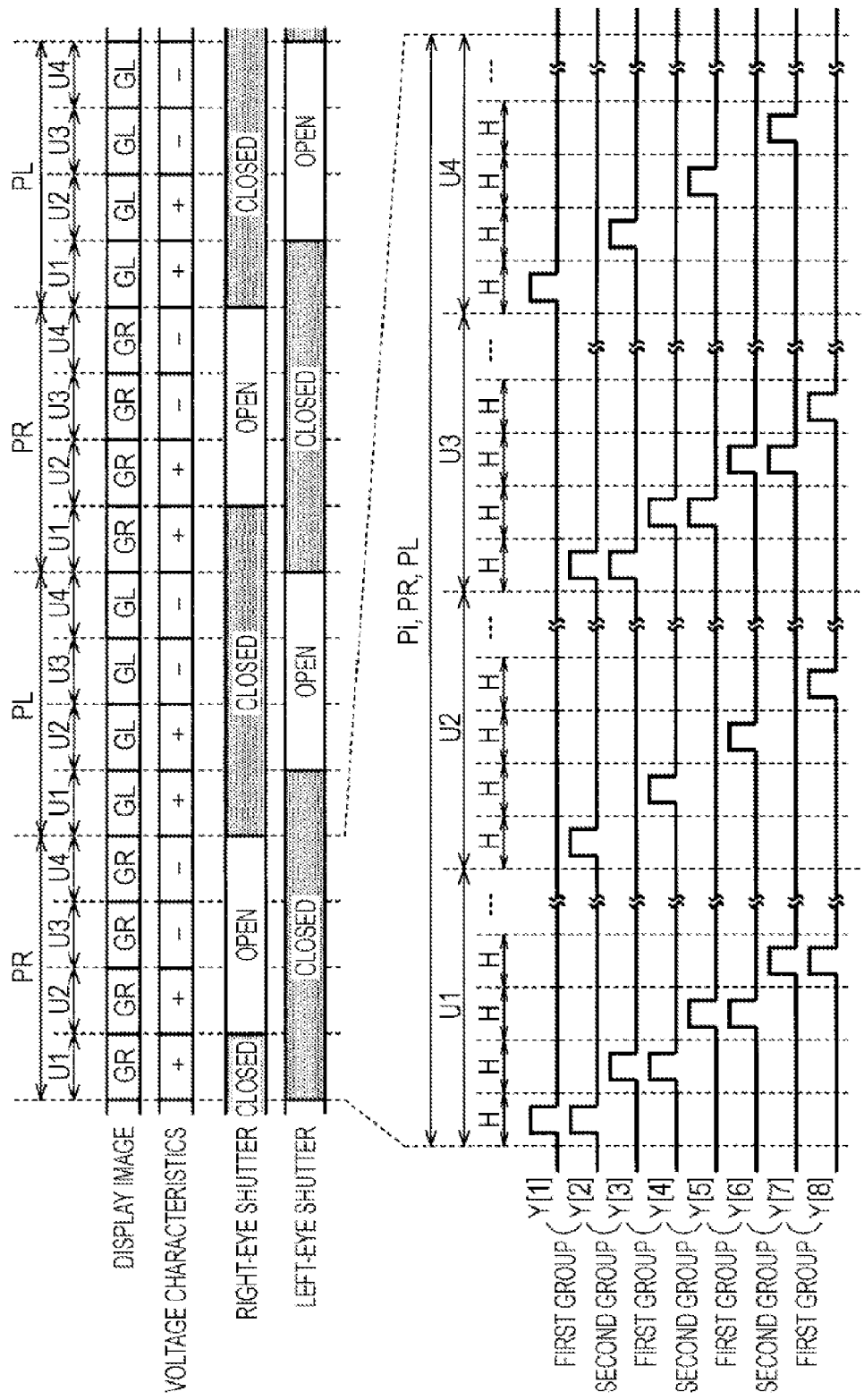
FIG. 5 is an explanatory diagram of an action of a stereoscopic display device.

FIG. 5 is an explanatory diagram of an action of the electro-optical device 10. As shown in FIG. 5, an action period of the electro-optical device 10 is segmented into a plurality of display periods Pi (a right-eye display period PR and a left-eye display period PL). The right-eye image GR is displayed in the pixel section 30 in the right-eye display period PR and the left-eye image GL is displayed in the pixel section 30 in the left-eye display period PL. The right-eye display period PR and the left-eye display period PL are alternatively arranged on a time axis. Each of the display periods Pi (PR, PL) is segmented into four unit periods U (U1 to U4) which are an equal length of time. The unit period U2 follows the unit period U1, the unit period U3 follows the unit period U2, and the unit period U4 follows the unit period U3. For example, the length of time of each of the display periods Pi is set to approximately $\frac{1}{120}$ of a second, and the length of time of each of the unit periods U is set to $\frac{1}{480}$ of a second.

The driving circuit 40 periodically inverts the polarity of the applied voltage with regard to the liquid crystal element CL of each of the pixels PIX. A configuration where the polarity of the applied voltage (for example, the polarity of a gradation potential X[n] with regard to a predetermined potential) with regard to the liquid crystal element CL is inverted for each two unit periods U is exemplified in FIG. 5. That is, the polarity of the applied voltage of the liquid crystal element CL is set to a positive polarity (for example, a state where the potential of the pixel electrode 62 is higher than the potential of the common electrode 64) in the unit period U1 and the unit period U2 in each of the pixel periods Pi and is set to a negative polarity (for example, a state where the potential of the pixel electrode 62 is lower than the potential of the common electrode 64) in the unit period U3 and the unit period U4 in each of the display periods Pi.

Figure 6:
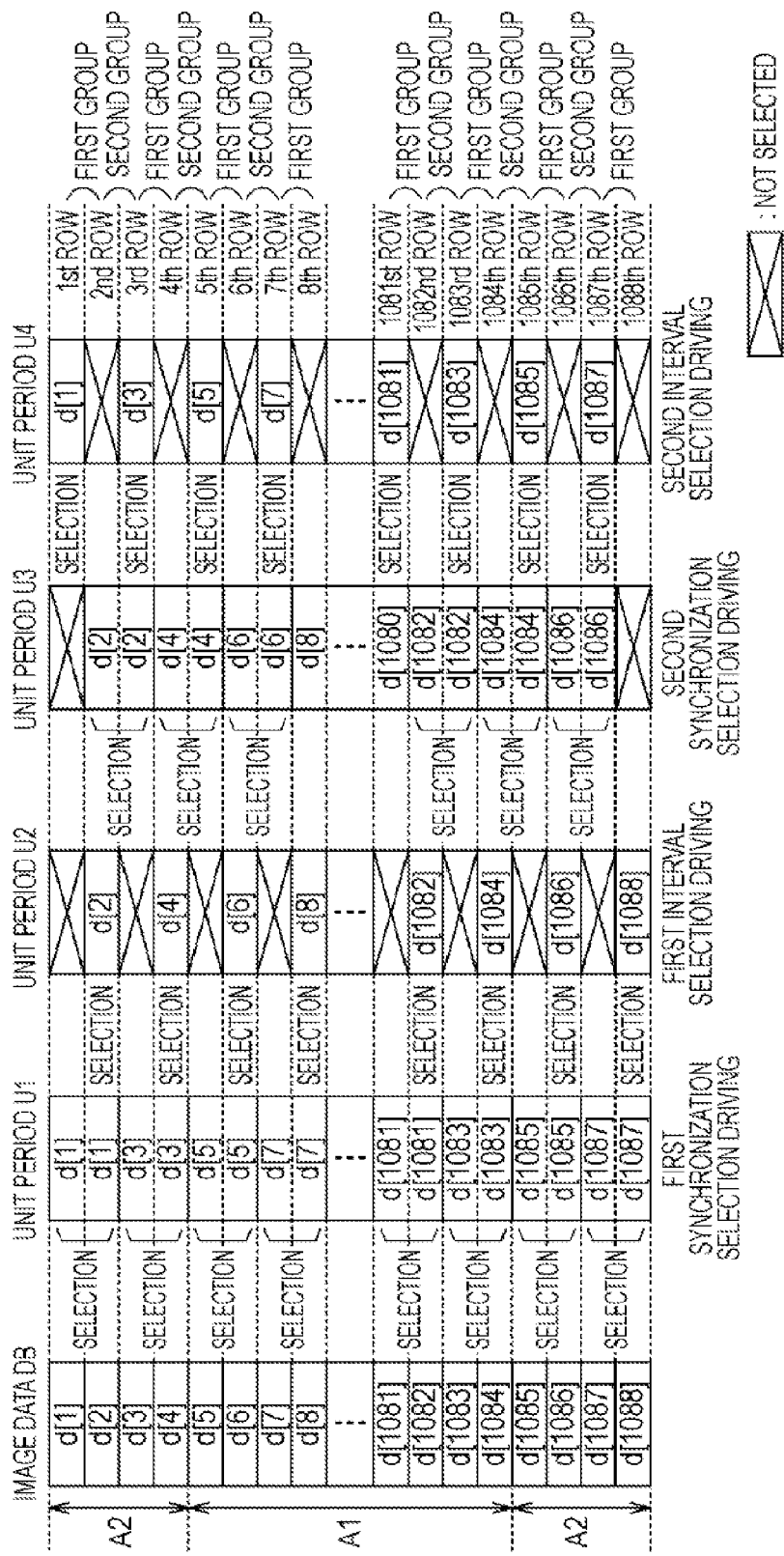
FIG. 6 is an explanatory diagram of an action of a driving circuit.

FIG. 6 is a schematic diagram which describes selection of the scanning line 32 using the scanning line driving circuit 42 and supply of the gradation potential X[n] using the signal line driving section 44 by focusing on one arbitrary column (1088 of the pixels PIX) in the pixel section 30. The action of the driving circuit 40 in the respective unit periods U1 to U4 in each of the display periods Pi (PR, PL) will be described below with reference to FIGS. 5 and 6.

1. Unit Period U1

As shown in FIG. 6, the driving circuit 40 executes an action in the unit period U1 in each of the display periods Pi (referred to below as "first synchronization selection driving") where each of a plurality of groups (referred to below as a "first group"), where the scanning lines 32 have been segmented for every two rows which are adjacent to each other, are sequentially selected for each selection period H and the gradation potential X[n] is supplied to each of the pixels PIX. The first group is configured by one line of the scanning lines 32 in an even row ($2k^{th}$ row) and one line of the scanning lines 32 in an odd row ($(2k-1)$ th row) which is adjacent to a negative side in a y direction with regard to the other scanning line 32. As is understood from FIGS. 5 and 6, it is possible to rephrase to that the first group is marked out with between the scanning line 32 on the inner side of the display region A1 (for example, the $5^{th}$ row of the scanning lines 32) and the scanning line 32 on the outer side of the display region A1 (for example, the $4^{th}$ row of the scanning lines 32) as one boundary.

Specifically, as shown in FIG. 5, in the $k^{th}$ selection period H out of the unit period U1 in each of the display periods Pi (PR, PL), the scanning line driving circuit 42 selects the two lines of the scanning lines 32 in the first group at the same time by setting a scanning signal Y[2k–1] and a scanning signal Y[2k] to a selection potential. For example, as shown in FIGS. 5 and 6, the two lines of the scanning lines 32 which are the $1^{st}$ row and the $2^{nd}$ row are selected at the same time in the $1^{st}$ selection period H in the unit period U1, and the two lines of the scanning lines 32 which are the $3^{rd}$ row and the $4^{th}$ row are selected at the same time in the $2^{nd}$ selection period H in the unit period U1.

In the unit period U1 in each of the display periods Pi, the second processing section 54 of the processing circuit 50 supplies the image signal VID which specifies the gradation d[2k–1] (d[1], d[3], d[5], . . . ) of each of the pixels PIX in the odd rows ($(2k-1)^{th}$ row) out of the image data DB in a time series manner to the signal line driving circuit 44. As shown in FIG. 6, in the selection period H where the two lines of the scanning lines 32 which are the $(2k-1)^{th}$ row and the $2k^{th}$ row which configure the first group out of the unit period U1 in each of the display periods Pi (PR, PL), the signal line driving circuit 44 supplies the gradation potential X[n] to each of the signal lines 34 according to the gradation d[2k–1] which is specified in each of the pixels PIX in the $(2k-1)^{th}$ row by the image signal VID. Accordingly, for example, the gradation potential X[n] is supplied to each of the pixels PIX in the $1^{st}$ row and the $2^{nd}$ row according to the gradation d[1] in the $1^{st}$ selection period H in the unit period U1, and the gradation potential X[n] is supplied to each of the pixels PIX in the $3^{rd}$ row and the $4^{th}$ row according to the gradation d[3] in the $2^{nd}$ selection period H in the unit period U1. As the result of the first synchronization selection driving which is described above, the image Gi where the resolution in the y direction is halved is displayed in the pixel section 30 at the completion point of the unit period U1 of each of the display periods Pi (PR, PL).

2. Unit Period U2

As shown in FIG. 6, the driving circuit 40 executes an action in the unit period U2 in each of the display periods Pi (referred to below as "first interval selection driving") where each of the scanning lines 32 in the even rows are sequentially selected for each selection period H and the gradation potential X[n] is supplied to each of the pixels PIX. That is, the scanning lines 32 are selected for every second line. The scanning lines 32 in the odd rows are not selected in the unit period U2.

Specifically, as shown in FIG. 5, in the $k^{th}$ selection period H out of the unit period U2 in each of the display periods Pi (PR, PL), the scanning line driving circuit 42 selects the one line of the scanning line 32 in the $2k^{th}$ row by setting a scanning signal Y[2k] to the selection potential. For example, as shown in FIGS. 5 and 6, the $2^{nd}$ row of the scanning lines 32 are selected in the $1^{st}$ selection period H in the unit period U2 and the $4^{th}$ row of the scanning lines 32 are selected in the $2^{nd}$ selection period H in the unit period U2.

In the unit period U2 in each of the display periods Pi, the second processing section 54 of the processing circuit 50 supplies the image signal VID which specifies the gradation d[2k] (d[2], d[4], d[6], . . . ) of each of the pixels PIX in the even rows ($(2k)^{th}$ row) out of the image data DB in a time series manner to the signal line driving circuit 44. As shown in FIG. 6, in the selection period H where the one line of the scanning lines 32 which is in the $2k^{th}$ row out of the unit period U2 in each of the display periods Pi (PR, PL), the signal line driving circuit 44 supplies the gradation potential X[n] to each of the signal lines 34 according to the gradation d[$2k$] which is specified in each of the pixels PIX in the $2k^{th}$ row by the image signal VID. Accordingly, for example, the gradation potential X[n] is supplied to each of the pixels PIX in the $2^{nd}$ row according to the gradation d[2] in the $1^{st}$ selection period H in the unit period U2, and the gradation potential X[n] is supplied to each of the pixels PIX in the $4^{th}$ row according to the gradation d[4] in the $2^{nd}$ selection period H in the unit period U2. As the result of the first interval selection driving which is described above, the image Gi where the resolution in the y direction is displayed as half at the completion point of the unit period U1 is updated to the image Gi with the expected resolution (1080 rows vertically by 1920 columns horizontally) at the completion point of the unit period U2.

3. Unit Period U3

As shown in FIG. 6, the driving circuit 40 executes an action (referred to below as "second synchronization selection driving") in the unit period U3 in each of the display periods Pi where each of a plurality of groups (referred to below as a "second group"), where the scanning lines 32 have been segmented for every two rows which are adjacent to each other in a combination which is different to the first group described above, are sequentially selected for each selection period H and the gradation potential X[n] is supplied to each of the pixels PIX. The second group is configured by one line of the scanning lines 32 ($2k^{th}$ row) in an even row and one line of the scanning lines 32 (($2k$+1)$^{th}$ row) in an odd row which is adjacent to a positive side in a y direction with regard to the other scanning line 32. That is, the first group and the second group are in a relationship which is shifted by only one line of the scanning line 32 in the y direction. It is possible to rephrase to that the second group is marked out so as to span between the scanning line 32 on the inner side of the display region A1 (for example, the $5^{th}$ row of the scanning lines 32) and the scanning line 32 on the outer side of the display region A1 (for example, the $4^{th}$ row of the scanning lines 32).

Specifically, as shown in FIG. 5, in the $k^{th}$ selection period H out of the unit period U3 in each of the display periods Pi (PR, PL), the scanning line driving circuit 42 selects the two lines of the scanning lines 32 in the second group at the same time by setting a scanning signal Y[$2k$] and a scanning signal Y[$2k$+1] to the selection potential. For example, as shown in FIGS. 5 and 6, the two lines of the scanning lines 32 which are the $2^{nd}$ row and the $3^{rd}$ row are selected at the same time in the $1^{st}$ selection period H in the unit period U3 and the two lines of the scanning lines 32 which are the $4^{th}$ row and the $5^{th}$ row are selected at the same time in the $2^{nd}$ selection period H in the unit period U3.

In the unit period U3 in each of the display periods Pi, the second processing section 54 of the processing circuit 50 supplies the image signal VID which specifies the gradation d[$2k$] of each of the pixels PIX in the even rows (($2k$)$^{th}$ row) out of the image data DB in a time series manner to the signal line driving circuit 44 in the same manner as in the unit period U2. As shown in FIG. 6, in the selection period H where the two lines of the scanning lines 32 which are the $2k^{th}$ row and the ($2k$+1)$^{th}$ row which configure the second group out of the unit period U3 in each of the display periods Pi (PR, PL), the signal line driving circuit 44 supplies the gradation potential X[n] to each of the signal lines 34 according to the gradation d[$2k$] which is specified in each of the pixels PIX in the $2k^{th}$ row by the image signal VID. Accordingly, for example, the gradation potential X[n] is supplied to each of the pixels PIX in the $2^{nd}$ row and the $3^{rd}$ row according to the gradation d[2] in the $1^{st}$ selection period H in the unit period U3, and the gradation potential X[n] is supplied to each of the pixels PIX in the $4^{th}$ row and the $5^{th}$ row according to the gradation d[4] in the $2^{nd}$ selection period H in the unit period U3. As the result of the second synchronization selection driving which is described above, the image Gi where the resolution in the y direction is halved is displayed in the pixel section 30 at the completion point of the unit period U3 of each of the display periods Pi (PR, PL) in the same manner as the unit period U1.

Here, a configuration is exemplified as is convenient where the $1^{st}$ row and the $1088^{th}$ row are not selected in the unit period U3 in the description above, but it is possible for the gradation potential X[n] to be supplied to each of the pixels PIX according to the specific gradation (D[1], D[1088]) by the scanning lines 32 in the $1^{st}$ row and the $1088^{th}$ row being selected in the unit period U3.

4. Unit Period U4

As shown in FIG. 6, the driving circuit 40 executes an action (referred to below as "second interval selection driving") in the unit period U4 in each of the display periods Pi where each of the scanning lines 32 in the odd rows are sequentially selected for each selection period H and the gradation potential X[n] is supplied to each of the pixels PIX. That is, the scanning lines 32 are selected for every second line. The scanning lines 32 in the even rows are not selected in the unit period U2.

Specifically, as shown in FIG. 5, in the $k^{th}$ selection period H out of the unit period U4 in each of the display periods Pi (PR, PL), the scanning line driving circuit 42 selects the one line of the scanning line 32 in the ($2k$–1)$^{th}$ row by setting a scanning signal Y[$2k$–1] to the selection potential. For example, as shown in FIGS. 5 and 6, the $1^{st}$ row of the scanning lines 32 are selected in the $1^{st}$ selection period H in the unit period U4 and the $3^{rd}$ row of the scanning lines 32 are selected in the $2^{nd}$ selection period H.

In the unit period U4 in each of the display periods Pi, the second processing section 54 of the processing circuit 50 supplies the image signal VID which specifies the gradation d[$2k$–1] of each of the pixels PIX in the odd rows (($2k$–1)$^{th}$ row) out of the image data DB in a time series manner to the signal line driving circuit 44 in the same manner as in the unit period U1. As shown in FIG. 6, in the selection period H where the one line of the scanning lines 32 which is the ($2k$–1)$^{th}$ row out of the unit period U4 in each of the display periods Pi (PR, PL), the signal line driving circuit 44 supplies the gradation potential X[n] to each of the signal lines 34 according to the gradation d[$2k$–1] which is specified in each of the pixels PIX in the ($2k$–1)$^{th}$ row by the image signal VID. Accordingly, for example, the gradation potential X[n] is supplied to each of the pixels PIX in the $1^{st}$ row according to the gradation d[1] in the $1^{st}$ selection period H in the unit period U4, and the gradation potential X[n] is supplied to each of the pixels PIX in the $3^{rd}$ row according to the gradation d[3] in the $2^{nd}$ selection period H in the unit period U4. As the result of the second interval selection driving which is described above, the image Gi where the resolution in the y direction is displayed as half at the completion point of the unit period U3 is updated to the image Gi with the expected resolution (1080 rows vertically by 1920 columns horizontally) at the completion point of the unit period U4. The above is the action of the driving circuit 40 in each of the unit periods U.

Figures 7, 8:
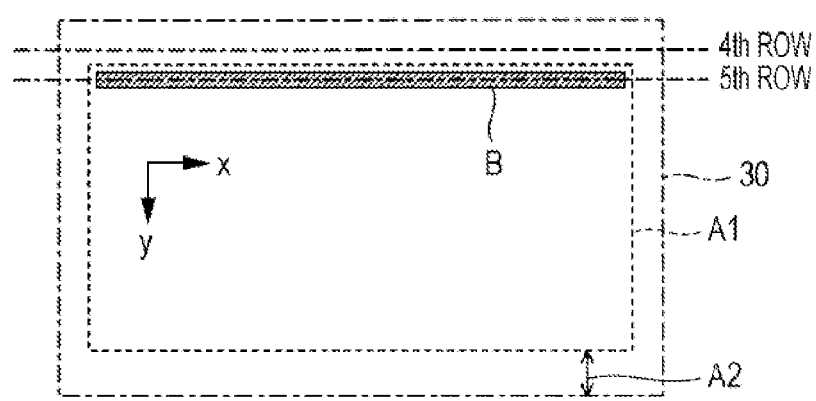
FIG. 7 is an explanatory diagram of image data in a comparative example.
FIG. 8 is an explanatory diagram of problems with the comparative example.

The image data DB which is applied in the action above will be described in detail. First, image data DB' of FIG. 7 is assumed in comparison to the first embodiment. In the image data DB' of FIG. 7, the gradations d[1] to d[4] and the gradations d[1085] to d[1088] which correspond to each of the pixels (dummy pixels) PIX in the peripheral region A2 are set to a predetermined gradation value C0. The gradation value C0 is a gradation value which is set in a fixed manner with no relationship with the image Gi which is displayed in the display region A1. A typical example of the gradation value C0 is black (the lowest gradation). On the other hand, the gradations d[5] to d[1084] which correspond to each of the pixels PIX in the display region A1 out of the image DB' are set to the gradation value which is specified by the image data DA which indicates the image Gi (the right-eye image GR and the left-eye image GL).

As described above, in the unit period U3 in each of the display periods Pi, the scanning lines 32 of the second group which are configured by the $2k^{th}$ row and the $(2k+1)^{th}$ row are sequentially selected and the gradation potential X[n] is supplied to each of the pixels PIX in the two rows in the selected state according to the gradation d[2k] of the $2k^{th}$ rows (the even rows). Accordingly, as shown in FIG. 7, the gradation pixel X[n] is supplied according to the gradation d[4] of the pixel PIX in the $4^{th}$ row in each of the pixels in the $4^{th}$ row and the $5^{th}$ row which configure the second group. Since the pixel PIX in the $4^{th}$ row is the dummy pixel which is positioned at the outer side of the display region A1 (in the peripheral region A2), the gradation d[4] where the image data DB' is specified in each of the pixels PIX in the $4^{th}$ row is set to the predetermined gradation value C0. On the other hand, each of the pixels PIX in the $5^{th}$ row is an effective pixel which is positioned at an inner side of the display region A1. That is, in a case where the image data DB' of FIG. 7 is used, as shown by the arrow α in FIG. 7, the display gradation of the pixels PIX in the $5^{th}$ row which is positioned in the display region A1 is controlled to be the gradation value C0 in the same manner as the pixels PIX in the peripheral region A2. Accordingly, as shown in FIG. 8, in the unit period U3, all of the pixels PIX in the $5^{th}$ row (the $1^{st}$ row in the y direction in the display region A1) which are positioned in the display region A1 are set to the gradation value C0 with no relationship with the image Gi. That is, there is a problem in that a horizontal line B of the gradation value C0 which extends in the x direction across the entire width of the display region A1 in the uppermost portion in the display region A1 is visually recognized by the observer.

In consideration of the circumstances above, the first processing section 52 of the first embodiment generates the image data DB of FIG. 9. In the image data DB of FIG. 9, the gradations d[1] to d[3] and the gradations d[1086] to d[1088] which correspond to each of the pixels PIX in the peripheral region A2 are set to the predetermined gradation value C0 (for example, a black gradation) and the gradations d[5] to d[1084] which correspond to each of the pixels PIX in the display region A1 are set to the gradation value which is specified by the image Gi in the same manner as the image data DB' of FIG. 7. On the other hand, in the image data DB of FIG. 9, the gradation d[4] of each of the pixels PIX in the $4^{th}$ row which is adjacent to the display region A1 in the peripheral region A2 is set to the gradation value which is the same as the gradation d[5] of each of the pixels PIX in the $5^{th}$ row which is adjacent in the display region A1 (that is, the gradation value according to the image Gi). In the same manner, the gradation d[1085] of each of the pixels PIX in the $1085^{th}$ row which is adjacent to the display region A1 is set to the gradation value which is the same as the gradation d[1084] of each of the pixels PIX in the $1084^{th}$ row which is adjacent in the display region A1.

As shown in FIG. 9, in the unit period U3 of each of the display periods Pi, the gradation d[4] which is set as the gradation value in common with the gradation d[5] is supplied to each of the pixels PIX in the $4^{th}$ row and the $5^{th}$ row. That is, the display gradation of the pixels (effective pixels) PIX in the $5^{th}$ row which are positioned at the inner side of the display region A1 are no the predetermined gradation value C0 but are set as the gradation value according to the image Gi. Accordingly, there is an advantage in that it is possible to prevent the generation of the horizontal line B of the gradation value C0 in the display region A1 which has been described with reference to FIG. 8.

FIG. 10 is a block diagram of the first processing section 52 which generates the image data DB of FIG. 9 described above. Here, in the description below, an arbitrary column in the pixel section 30 will be focused on, but the process is executed in the same manner for each column in the pixel section 30. As shown in FIG. 10, the image data DA which is supplied from a higher-level device specifies the gradations d[5] to d[1084] of each of the pixels for 1080 lines in the display region A1 (refer to FIG. 4).

Figure 11:
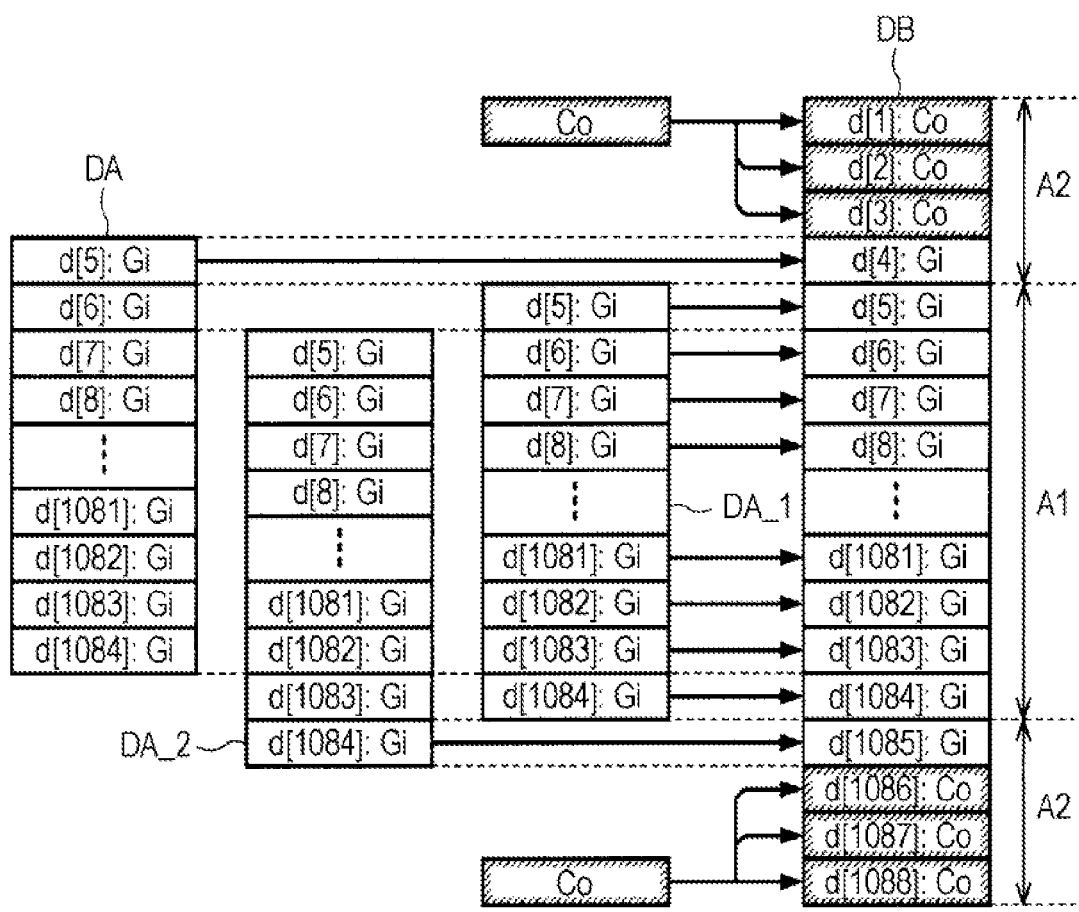
FIG. 11 is an explanatory diagram of an action of the first processing section.

As shown in FIG. 10, the first processing section 52 is configured to include a storage section 522, a storage section 524, and an image processing section 526. The storage section 522 stores the gradations d[5] to d[1084] of the image data DA which is supplied to the first processing section 52 and outputs the gradations d[5] to d[1084] to the image processing section 526 as image data DA_1. In addition, the storage section 524 stores the image data DA_1 (the gradations d[5] to d[1084]) which is output from the storage section 522 and outputs the image data DA_1 to the image processing section 526 as image data DA_2. The storage section 522 and the storage section 524 function as delay elements where the image data DA is delayed by one row (line memories which are configured using latch circuits). Accordingly, as shown in FIG. 11, the image data DA which is supplied from the higher-level device, the image data DA_1 where the image data DA is delayed by one row, and the image data DA_2 where the image data DA_1 is delayed by one row are supplied to the image processing section 526.

The image processing section 526 of FIG. 10 generates the image data DB using the image data DA, the image data DA_1, and the image data DA_2. Firstly, as shown in FIG. 11, the image processing section 526 selects the gradations d[5] to d[1084] of the image data DA_1 which is supplied from the storage section 522 as the gradations d[5] to d[1084] of the image data DB. Secondly, the image processing section 526 selects the gradation d[5] at the front of the image data DA which is supplied from the upper-level device as the gradation d[4] of the image data DB and selects the gradation d[1084] at the end of the image data DA_2 which is supplied from the storage section 524 as the gradation d[1085] of the image data DB. That is, the gradation d[4] which corresponds to each of the pixels PIX in the $4^{th}$ row which is adjacent to the display region A1 in the peripheral region A2 out of the image data DB is set as the same gradation value as the gradation d[5] of the pixels PIX in the $5^{th}$ row (that is, the gradation value according to the image Gi) and the gradation d[1085] of the pixels PIX in the peripheral region A2 out of the image data DB is set as the same gradation value as the gradation d[1084] of the pixels PIX in the display region A1. Thirdly, the first processing section 52 sets the gradations d[1] to d[3] and the gradations d[1086] to d[1088] of the image data DB as the predetermined gradation value C0. The configuration and the sequence where the first processing section 52 generates the image data DB from the image data DA is the same as above.

The glasses control circuit 144 of the control circuit 14 of FIG. 1 controls the state (open state or closed state) of each of the right-eye shutter 22 and the left-eye shutter 24 of the stereoscopic glasses 20 by synchronizing with the action of the electro-optical panel 12. Specifically, as shown in FIG. 5, the glasses control circuit 144 maintains both of the right-eye shutter 22 and the left-eye shutter 24 in the closed state in the unit period of the U1 of each of the display periods P (PR, PL). In addition, the glasses control circuit 144 maintains of the right-eye shutter 22 in the open state and the left-eye shutter 24 in the closed state in the period other than the unit period U1 of the right-eye display period PR (from the starting point of the unit period U2 to the completion point of the unit period U4), and maintains of the left-eye shutter 24 in the open state and the right-eye shutter 22 in the closed state in the period other than the unit period U1 of the left-eye display period PL.

Accordingly, the right-eye image GR which is displayed in the display region A1 of the pixel section 30 in the unit period U2 to the unit period U4 in the right-eye display period PR reaches the right eye of the observer by passing through the right-eye shutter 22 and is blocked by the left-eye shutter 24. On the other hand, the left-eye image GL which is displayed in the display region A1 of the pixel section 30 in the unit period U2 to the unit period U4 in the left-eye display period PL reaches the left eye of the observer by passing through the left-eye shutter 24 and is blocked by the right-eye shutter 22. By the right-eye image GR which passes through the right-eye shutter 22 being visually recognized by the right eye and the left-eye image GL which passes through the left-eye shutter 24 being visually recognized by the left eye, the observer perceives a stereoscopic effect in the display image.

The left-eye image GL which is displayed in the left-eye display period PL immediately beforehand (the unit period U4) is sequentially updated to the right-eye image GR in units of two rows in the unit period U1 in the right-eye display period PR, and the right-eye image GR which is displayed in the right-eye display period PR immediately beforehand (the unit period U4) is sequentially updated to the left-eye image GL in units of two rows in the unit period U1 in the left-eye display period PL. That is, the right-eye image GR and the left-eye image GL are in a mixed state in the unit period U1 in each of the display periods P. In the embodiment, since both of the right-eye shutter 22 and the left-eye shutter 24 are maintained in the closed state in the unit period U1 in each of the display periods P, cross talk of the right-eye image GR and the left-eye image GL is not perceived by the observer. That is, since the right-eye image GR and the left-eye image GL are reliably separated to the right eye and the left eye, it is possible for a clear stereoscopic effect to the perceived by the observer.

In the first embodiment described above, the gradation potential X[n] is supplied to each of the pixels PIX by the scanning lines 32 being selected in units of two rows in the unit period U1 in each of the display periods Pi. Accordingly, when compared to a configuration where the scanning line 32 are selected in units of one row in the unit period U1 in each of the display periods Pi, a length of time of a period, where the right-eye image GR and the left-eye image GL are in a mixed state (in the unit period U1 where both the right-eye shutter 22 and the left-eye shutter 24 are maintained in a closed state in order to prevent cross talk), is reduced. That is, the length of time, when it is possible for the right-eye shutter 22 and the left-eye shutter 24 to be maintained in the open state out of the display period Pi, is sufficiently secured.

Accordingly, it is possible for the brightness of the display image which is visually recognizes by the observer to be improved.

Second Embodiment

The second embodiment of the invention will be described below. Here, with regard to elements where the action and the function in each aspect which is exemplified above is the same as the first embodiment, the reference numerals which are referenced in the description above are used and the respective detailed description thereof will be appropriately omitted.

Figure 12:
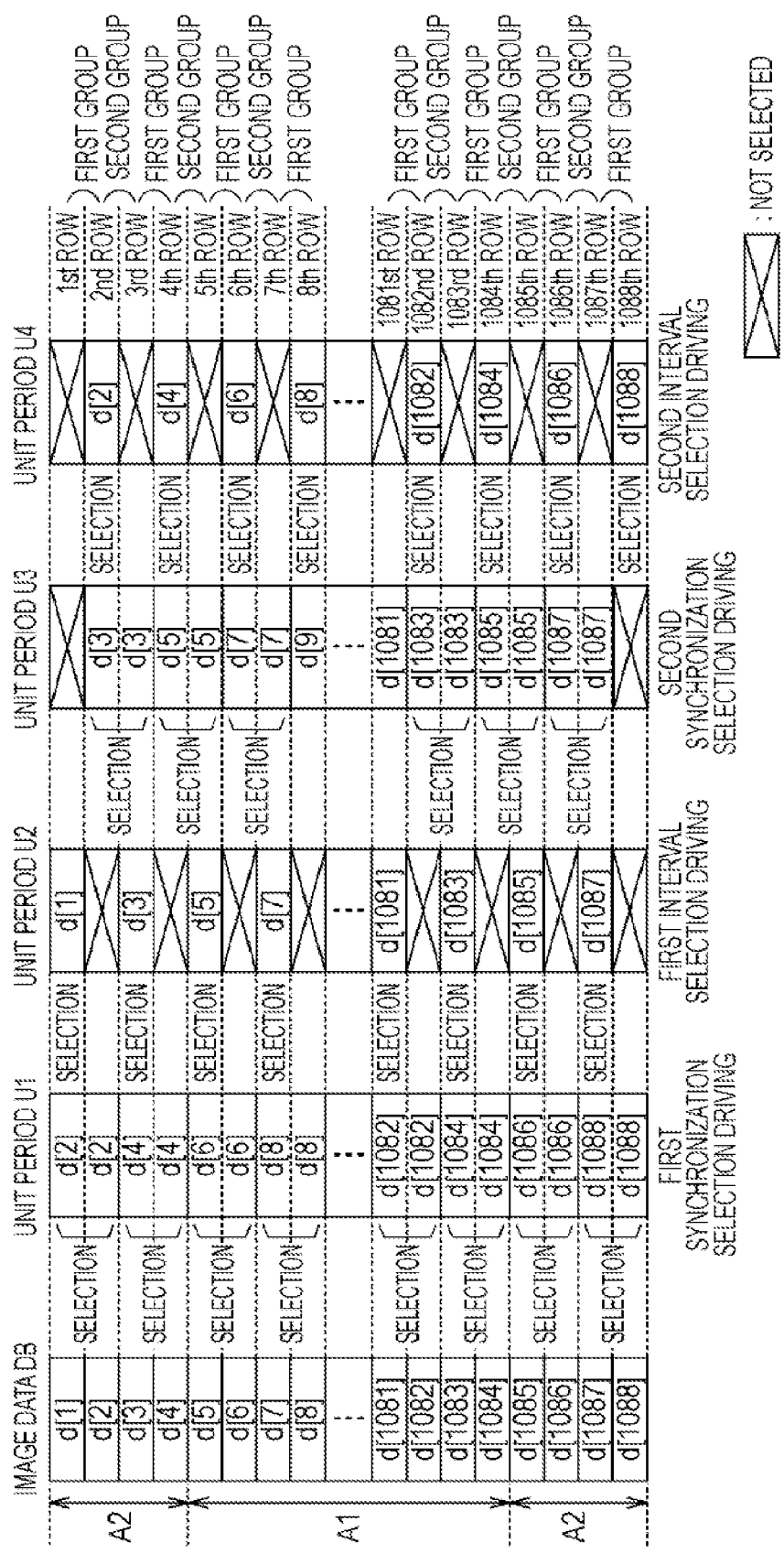
FIG. 12 is an explanatory diagram of an action of a driving circuit according to a second embodiment.

FIG. 12 is an explanatory diagram of an action of the driving circuit 40 according to the second embodiment. As shown in FIG. 12, in the driving circuit 40 of the second embodiment, the odds and evens of the gradation d which is reflected by the gradation potential X[n] in each of the unit periods U is the reverse of the first embodiment (FIG. 6). The second processing section 54 of the processing circuit 50 supplies the image signal VID which specifies the gradation d[$2k$] of each of the pixels PIX in the even rows out of the image data DB to the driving circuit 40 in the unit period U1 and the unit period U4 in each of the display periods Pi and supplies the image signal VID which specifies the gradation d[$2k-1$] of each of the pixels PIX in the odd rows out of the image data DB to the driving circuit 40 in the unit period U2 and the unit period U3 in each of the display periods Pi. The content of the image data DB is the same as the first embodiment.

In the unit period U1 in each of the display periods Pi, the driving circuit 40 sequentially selects the first group which is configured by the $(2k-1)^{th}$ row and the $2k^{th}$ row for each of the selection periods H and supplies the gradation X[n] to each of the pixels PIX according to the gradation d[$2k$] (d[2], d[4], d[6], ...) which is specified by the image signal VID with regard to each of the pixels PIX which correspond to the even rows ($2k^{th}$ row) out of the first group in the selected state. In addition, in the unit period U2 in each of the display periods Pi, the driving circuit 40 sequentially selects the scanning lines 32 in the odd rows (($2k-1)^{th}$ row) for each of the selection periods H and supplies the gradation X[n] to each of the pixels PIX according to the gradation d[$2k-1$] (d[1], d[3], d[5], ...) which is specified by the image signal VID with regard to each of the pixels PIX in the odd rows which correspond to the scanning lines 32 in the selected state.

On the other hand, in the unit period U3 in each of the display periods Pi, the driving circuit 40 sequentially selects the second group which is configured by the $2k^{th}$ row and the $(2k+1)^{th}$ row for each of the selection periods H and supplies the gradation X[n] to each of the pixels PIX according to the gradation d[$2k+1$] (d[3], d[5], d[7], ...) which is specified by the image signal VID with regard to each of the pixels PIX which correspond to the odd rows (($2k+1)^{th}$ row) out of the second group in the selected state. In addition, in the unit period U4 in each of the display periods Pi, the driving circuit 40 sequentially selects the scanning lines 32 in the even rows ($2k^{th}$ row) for each of the selection periods H and supplies the gradation X[n] to each of the pixels PIX according to the gradation d[$2k$] (d[2], d[4], d[6], ...) which is specified by the image signal VID with regard to each of the pixels PIX in the even rows which correspond to the scanning lines 32 in the selected state.

As is understood from the description above, in the second embodiment, in the selection period H out of the unit period U3 where the second group which includes the $1084^{th}$ row and the $1085^{th}$ row is selected, the gradation potential X[n] is supplied according to the gradation d[1085] of the pixels PIX in the 1085$^{th}$ row (the dummy pixels in the peripheral region A2) with regard to each of the pixels PIX in the 1084$^{th}$ row in the display region A1 and each of the pixels PIX in the 1085$^{th}$ row in the peripheral region A2. Accordingly, in a case where the image data DB' in FIG. 7 is applied, the display gradation of each of the pixels PIX in the 1084$^{th}$ row in the display region A1 are set to the gradation value C0 with no relationship with the image Gi. That is, the horizontal line B of the gradation value C0 is displayed in a lowest portion of the display region A1 in each of the unit periods U3.

In the image data DB of FIG. 9, as is grasped from FIG. 11, the gradation d[1085] of each of the pixels PIX in the 1085$^{th}$ row which is adjacent to the display region A1 in the peripheral region A2 is set as the same gradation value as the gradation d[1084] of each of the pixels PIX in the 1084$^{th}$ row which is adjacent in the display region A1 (that is, the gradation value according to the image Gi). Accordingly, in the same manner as the first embodiment, there is an advantage in that it is possible to prevent the generation of the horizontal line B which is displayed in the 1084$^{th}$ row in the display region A1 in a case where the image data DB' of FIG. 7 is used.

As is understood from the description above, in order to prevent the generation of the horizontal line B in the display region A1 on the basis of the first embodiment, it is necessary to set the gradation d[4] of each of the pixels PIX of the scanning lines 32 (4$^{th}$ row) in the peripheral region A2, which is adjacent to the scanning line 32 in the 5$^{th}$ row which is selected first in the display region A1, to the gradation value which is the same as the gradation d[5] of each of the pixels PIX in the 5$^{th}$ row. On the other hand, in order to prevent the generation of the horizontal line B in the display region A1 on the basis of the second embodiment, it is necessary to set the gradation d[1085] of each of the pixels PIX of the scanning lines 32 (1085$^{th}$ row) in the peripheral region A2, which is adjacent to the scanning line 32 in the 1084$^{th}$ row which is selected last in the display region A1, to the gradation value which is the same as the gradation d[1084] of each of the pixels PIX in the 1084$^{th}$ row.

Third Embodiment

In the first synchronization selection driving and the second synchronization selection driving, the number of lines Q (Q is a natural number of two or more) of the scanning lines 32 which are selected at the same time in the selection period H is arbitrary. That is, it is possible for the first group which is selected in the first synchronization selection driving and the second group which is selected in the second synchronization selection driving to be configured by three or more scanning lines 32.

For example, in a configuration where five lines of the scanning lines 32 are selected at the same time, the gradation d[1] of each of the pixels PIX which corresponds to the 1$^{st}$ row in the peripheral region A2 is supplied to each of the signal lines 34 in a state where five lines from the 1$^{st}$ row to the 5$^{th}$ row of the scanning lines 32 are selected at the same time. Accordingly, it is necessary that the gradations d[1] to d[4] in the peripheral region A2 out of the image data DB is set as the gradation value which is the same as the gradation d[5] in the display region A1, and in addition, the gradations d[1085] to d[1088] in the peripheral region A2 out of the image data DB is set as the gradation value which is the same as the gradation d[1084] in the display region A1.

Figure 13:
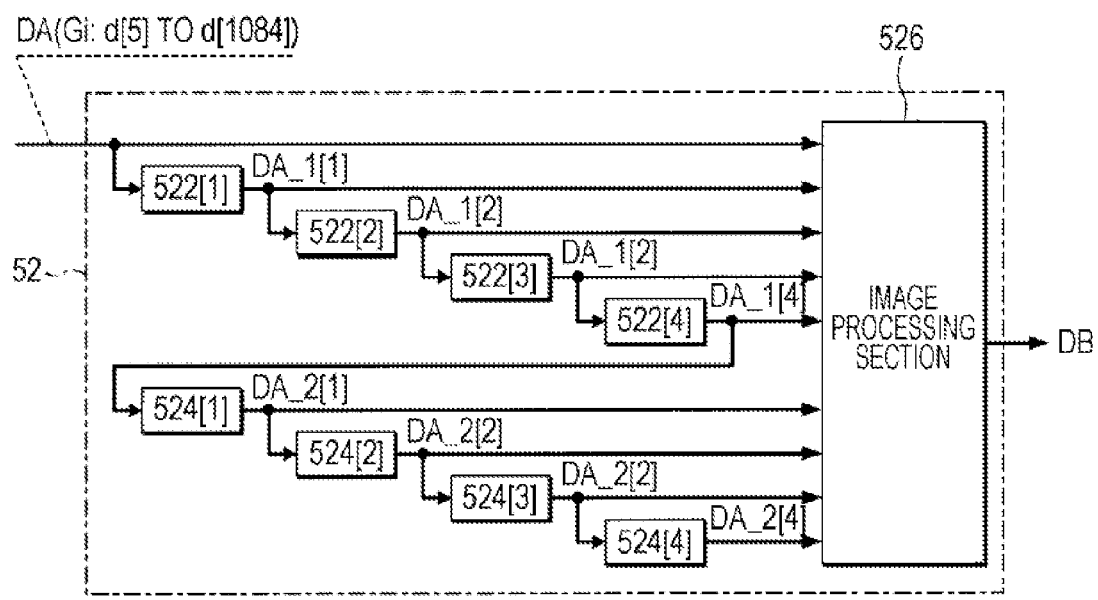
FIG. 13 is a block diagram of a first processing section according to a third embodiment.
Figure 14:
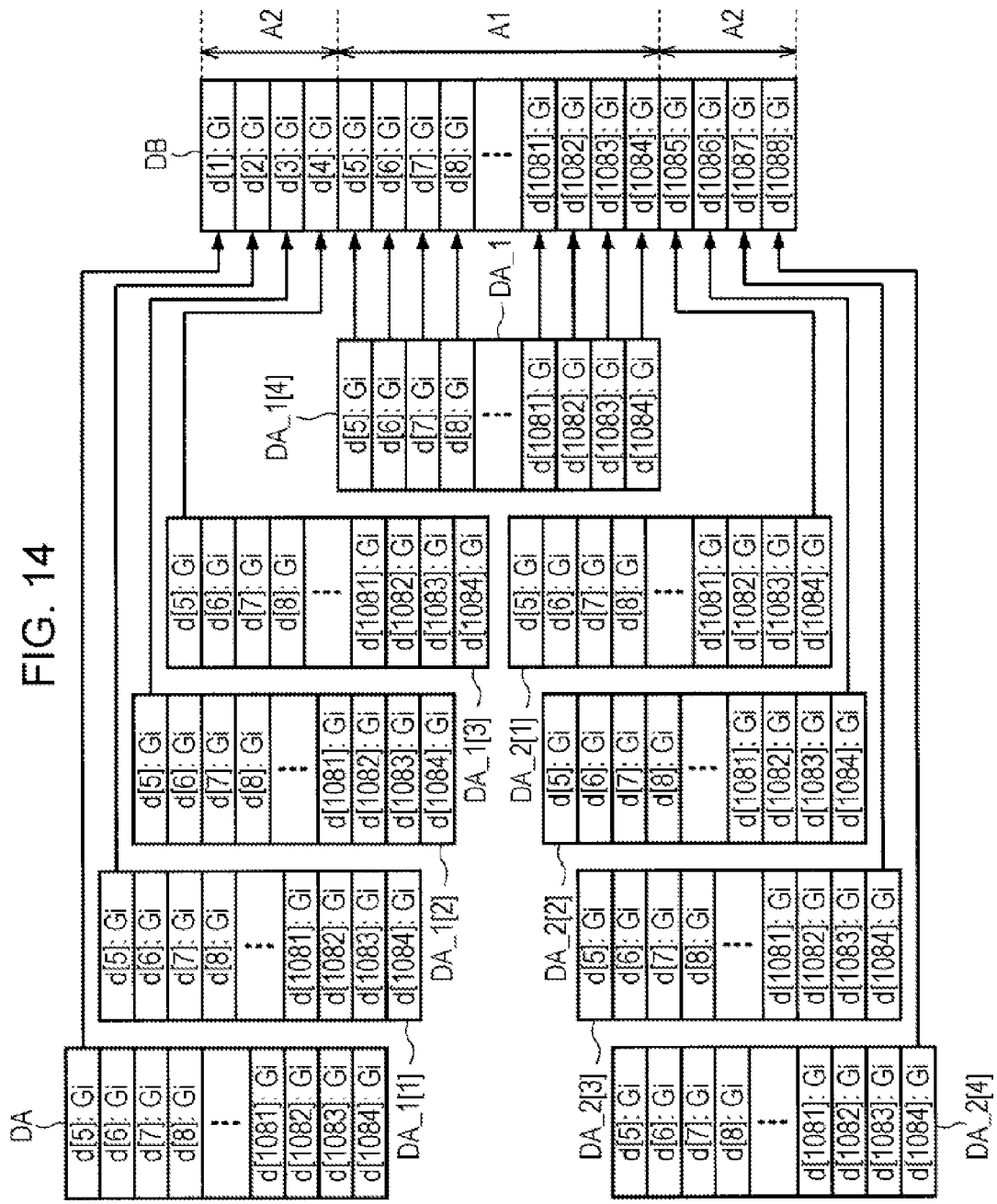
FIG. 14 is an explanatory diagram of an action of the first processing section according to the third embodiment.

FIG. 13 is a block diagram of the first processing section 52 where the case of five lines of the scanning lines 32 being selected at the same time (Q=5) in the first synchronization selection driving and the second synchronization selection driving is appropriately adopted. As shown in FIG. 13, the first processing section 52 of the third embodiment is configured to include four storage sections 522[1] to 552[4], four storage sections 524[1] to 524[4], and the image processing section 526. FIG. 14 is an explanatory diagram of an action of the first processing section 52.

The storage section 522[1] outputs the image data DA_1[1] where the image data DA which is supplied from a higher-level device is delayed by only one row. The storage section 522[k] (k=2, 3, 4) outputs the image data DA_1[k] where the image data DA_1[k-1] which is output from the storage section 522[k-1] at the previous level is delayed by only one row as shown in FIG. 14. On the other hand, the storage section 524[1] outputs the image data DA_2[1] where the image data DA_1[4] which is output from the storage section 522[4] is delayed by only one row. The storage section 524[k] outputs the image data DA_2[k] where the image data DA_2[k-1] which is output from the storage section 524[k-1] at the previous level is delayed by only one row.

As shown in FIG. 14, the image processing section 526 selects the gradations d[5] to d[1084] of the image data DA_1 [4] which is supplied from the storage section 522[4] as the gradation d[5] to d[1084] of the image data DB. In addition, the image processing section 526 selects the gradation d[5] at the front of each of the image data DA_and the image data DA_1[1] to DA_1[3] as the gradations d[1] to d[4] of the image data DB and selects the gradation d[1084] at the end of each of the image data DA_2[1] to DA_2[4] as the gradations d[1085] to d[1088] of the image data DB. Accordingly, image data DB is generated where the gradations d[1] to d[4] in the peripheral region A2 is set as the gradation value which is the same as the gradation d[5] in the display region A1 and the gradations d[1085] to d[1088] in the peripheral region A2 is set as the gradation value which is the same as the gradation d[1084] in the display region A1.

Modification Example

The aspects above may be modified in various ways. Specific modified aspects are exemplified below. Two or more of the aspects which are suitably selected from the following exemplifications may be arbitrarily combined in a range which is not mutually contradictory.

(1) In the aspects described above, the case where the first synchronization selection driving where the first group is sequentially selected is executed in the unit period U1 and the second synchronization selection driving where the second group is sequentially selected is executed in the unit period U3 is exemplified, but the order of the first synchronization selection driving and the second synchronization selection driving may be changed. For example, in each of the display periods Pi, it is possible for the second synchronization selection driving to be executed in the unit period U1 and the first synchronization selection driving to be executed in the unit period U3. In a case where the gradation potential X[n] is generated according to the gradation d[2k-1] in the odd rows in the unit period U1 or the unit period U3, the gradation potential X[n] is supplied to each of the pixels PIX in the even rows according to the gradation d[2k] in the even rows in the unit period U (U2 or U4) immediately following, and in a case where the gradation potential X[n] is generated according to the gradation d[2k] in the even rows in the unit period U1 or the unit period U3, the gradation potential X[n] is supplied to each of the pixels PIX in the odd rows according to the gradation d[2k−1] in the odd rows in the unit period U (U2 or U4) immediately following.

(2) The first interval selection driving and the second interval selection driving may be omitted. That is, only the first synchronization selection driving and the second synchronization selection driving is executed in each of the display periods Pi (the ordering of both driving is arbitrary). Here, in each of the first synchronization selection driving and the second synchronization selection driving, an image is displayed where the original resolution indicating the image data DA is halved. However, since there is a relationship where the first group which is selected in the first synchronization selection driving and the second group which is selected in the second synchronization selection driving are deviated by only one row, it is difficult for the observer to perceive the reduction in the resolution in the display periods Pi. As is understood from the described above, the number of the unit periods U in each of the display period Pi is arbitrary.

(3) In the aspects described above, the right-eye shutter 22 is changed from the closed state to the open state at the completion point of the unit period U1 of the right-eye display period PR, but the timing when the right-eye shutter 22 is changed from the closed state to the open state may be appropriately changed. For example, in a configuration where the right-eye shutter 22 is changed to the open state before the completion point of the unit period U1 of the right-eye display period PR, cross talk in the unit period U1 is slightly perceived by the observer, but the brightness of the display image is improved. On the other hand, in a configuration where the right-eye shutter 22 is changed to the open state after the completion point of the unit period U1 of the right-eye display period PR, the brightness of the display image is lowered but it is possible to effectively prevent cross talk being perceived by the observer. In the same manner, a configuration may be adopted where the period when the right-eye shutter 22 is changed from the open state to the closed state is set before or after the completion point of the unit period U4 of the right-eye display period PR. Here, the timing of the opening and closing where cross talk is difficult to be perceived by the observer depends on the relationship between the response characteristics of the right-eye shutter 22 and the left-eye shutter 24 and the response characteristics of the electro-optical panel 12 (the liquid crystal element CL). Accordingly, the timing of the opening and the closing of the right-eye shutter 22 is selected in consideration of various factors such as the prioritization of the preventing of cross talk and the securing of the brightness of the display image and the relationship of the response characteristics of the stereoscopic glasses 20 and the response characteristics of the electro-optical panel 12. Here, the right-eye shutter 22 is mentioned in the description above but the timing of the opening and closing of the left-eye shutter 24 is the same.

As is understood from the description above, the period where the right-eye shutter 22 is maintained in the open state is comprehended as the period (irrespective of whether or not a portion of the end of the unit period U1 immediately beforehand is included) which includes at least a portion of the period other than the unit period U1 of the right-eye display period PR (the unit period U2 to the unit period U4). In the same manner, the period where the left-eye shutter 24 is maintained in the open state is comprehended as the period (irrespective of whether or not a portion of the end of the unit period U1 immediately beforehand is included) which includes at least a portion of the period other than the unit period U1 of the left-eye display period PL. In addition, the period where both the right-eye shutter 22 and the left-eye shutter 24 are controlled to be in the close state is comprehended as the period (irrespective of whether or not a portion of the front of the unit period U2 immediately beforehand is included) which includes at least a portion of the unit period U1 of each of the display periods P (PR, PL).

(4) In the aspects described above, the electro-optical element (display element) is not limited to the liquid crystal element CL. For example, it is possible for an electrophoretic element to be used as the electro-optical element. That is, the electro-optical element is comprehended as the display element where the optical characteristics (for example, the transparency) changes according to an electrical action (for example, the application of a voltage).

Application Example

The electro-optical device 10 which is exemplified in each of the aspects above may be used in various types of electronic apparatuses. Specific aspects of the electronic apparatuses which adopt the electro-optical device 10 are exemplified in FIGS. 15 to 17.

Figure 15:
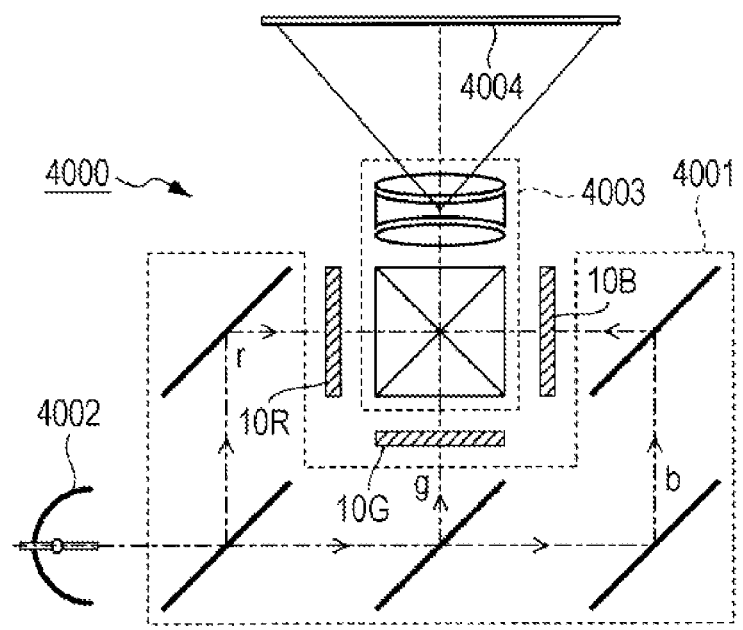
FIG. 15 is a perspective view of an electronic apparatus (a projector display device).

FIG. 15 is a schematic view of a projector display device (three plate type projector) 4000 which adopts the electro-optical device 10. The projector display device 4000 is configured to include three of the electro-optical devices 10 (10R, 10G, and 10B) which correspond to different display colors (red, green, and blue). Out of outgoing light from an illumination device (light source) 4002, an illumination optical system 4001 supplies a red component r to the electro-optical device 10R, supplies a green component g to the electro-optical device 10G, and supplies a blue component b to the electro-optical device 10B. Each of the electro-optical devices 10 functions as an optical modulator (light valve) which modulates each color of light which is supplied from the illumination optical system 4001 according to the display image. A projection optical system 4003 combines the outgoing light from each of the electro-optical devices 10 and projects to a projection screen 4004. The observer visually recognizes a stereoscopic image which is projected onto the projection screen 4004 using the stereoscopic glasses 20 (which are omitted from the diagram in FIG. 15).

Figure 16:
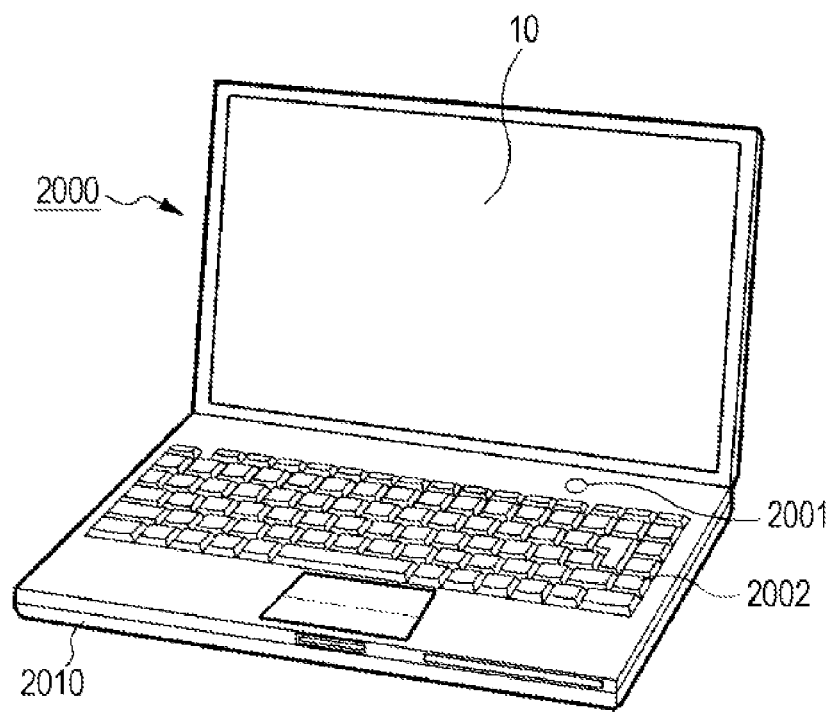
FIG. 16 is a perspective view of an electronic apparatus (a personal computer).

FIG. 16 is a perspective view of a portable personal computer which adopts the electro-optical device 10. A personal computer 2000 is provided with the electro-optical device 10 which display various types of images and a main body 2010 where a power switch 2001 and a keyboard 2002 are disposed.

Figure 17:
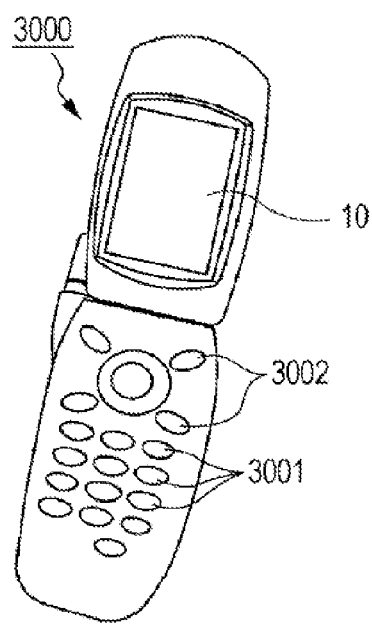
FIG. 17 is a perspective view of an electronic apparatus (a mobile phone).
Figure 18:
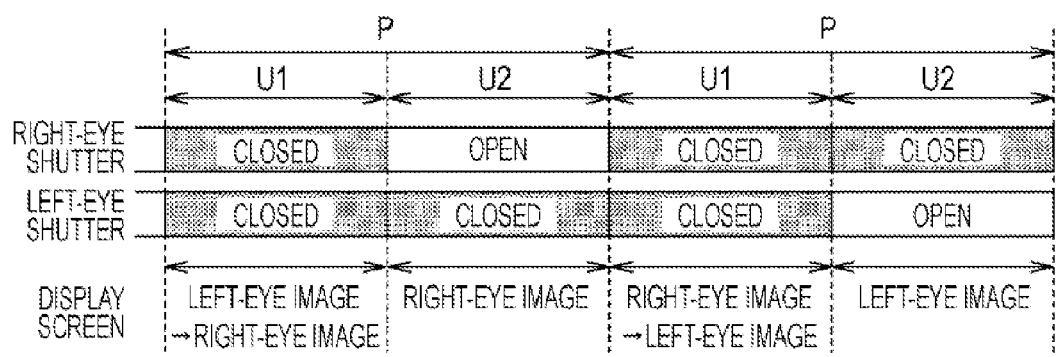
FIG. 18 is an explanatory diagram of a stereoscopic display in the related art.

FIG. 17 is a perspective view of a mobile phone which adopts the electro-optical device 10. A mobile phone 3000 is provided with a plurality of operation buttons 3001, a scroll button 3002, and the electro-optical device 10 which displays various types of images. By operating the scroll button 3002, the screen which is displayed in the electro-optical device 10 is scrolled.

Here, as the electronic apparatus where the electro-optical device according to the invention is applied, examples other than the apparatuses which are exemplified in FIGS. 15 to 17 include an apparatus which is provided with a personal digital assistant (PDA), a digital still camera, a television, a video camera, a car navigation device, a display unit for a vehicle (instrument panel), an electronic notebook, electronic paper, a calculator, a word processor, a work station, a TV phone, a POS terminal, a printer, a scanner, a copier, a video player, a touch panel.

This application claims priority to Japan Patent Application No. 2011-210291 filed Sep. 27, 2011, the entire disclosures of which are hereby incorporated by reference in their entireties.

What is claimed is:

1. An electro-optical device which displays a right-eye image in a first display period and a left-eye image in a second display period comprising:
a pixel which is arranged to correspond to intersection of a scanning line and a signal line;
a driving circuit which, in the display first period, executes first synchronization selection driving where a first group is sequentially selected, the first group is a first unit of Q lines (Q is a natural number of two or more) in a plurality of the scanning line which are adjacent to each other and a gradation potential is supplied to the signal line according to a specific gradation of the pixel which corresponds to one scanning line in the first group in a selected state, and executes second synchronization selection driving where a second group is sequentially selected, the second group is a second unit of Q lines in the plurality of the scanning line which are adjacent to each other are a different combination to the first group and a gradation potential is supplied to the signal line according to a specific gradation of the pixel which corresponds to one scanning line in the second group in a selected state; and
a display control circuit which controls the driving circuit so that the gradation potential is supplied to the signal line according to a specific gradation of the pixel which corresponds to a first scanning line out of the second group during the selection of the second group which includes the first scanning line which corresponds to an inner side of the display region and a second scanning line which corresponds to an outer side of the display region.

2. An electro-optical device which displays a right-eye image in a first display period and a left-eye image in a second display period comprising:
a pixel which is arranged to correspond to intersection of a scanning line and a signal line;
a driving circuit which, in the display first period, executes first synchronization selection driving where a first group is sequentially selected, the first group is a first unit of Q lines (Q is a natural number of two or more) in a plurality of the scanning line which are adjacent to each other and a gradation potential is supplied to the signal line according to a specific gradation of the pixel which corresponds to one scanning line in the first group in a selected state, and executes second synchronization selection driving where a second group is sequentially selected, the second group is a second unit of Q lines in the plurality of the scanning line which are adjacent to each other are a different combination to the first group and a gradation potential is supplied to the signal line according to a specific gradation of the pixel which corresponds to one scanning line in the second group in a selected state; and
a display control circuit which controls the driving circuit so that the gradation potential is supplied to the signal line according to a specific gradation of the pixel which corresponds to a second scanning line out of the first group during the selection of the first group which includes the first scanning line which corresponds to an inner side of the display region and a second scanning line which corresponds to an outer side of the display region.

3. The electro-optical device according to claim 1, wherein in the first display periods, the driving circuit executes the first synchronization selection driving where the first group is sequentially selected so that a gradation potential is supplied to the signal line according to a gradation where an image signal is specified for the pixel which corresponds to even rows of the scanning line out of the first group in a selected state and the second synchronization selection driving where the second group is sequentially selected so that a gradation potential is supplied to the signal line according to a gradation where an image signal is specified for the pixel which corresponds to odd rows of the scanning line out of the second group in a selected state.

4. The electro-optical device according to claim 1, wherein the driving circuit makes possible first interval selection driving where the scanning line of one of the odd rows or the even rows out of the plurality of the scanning line are sequentially selected and a gradation potential is supplied to the signal line according to a specific gradation of the pixel which corresponds to the scanning line in a selected state and second interval selection driving where the scanning line of the other one of the odd rows or the even rows out of the plurality of the scanning line are sequentially selected and a gradation potential is supplied to the signal line according to a specific gradation of the pixel which corresponds to the scanning line in a selected state and executes the first interval driving after the execution of either one of the first synchronization selection driving and the second synchronization selection driving and executes the second interval driving after the execution of the other one of the first synchronization selection driving and the second synchronization selection driving.

5. An electronic apparatus comprising:
the electro-optical device according to claim 1.

* * * * *